(12) United States Patent
Zhou et al.

(10) Patent No.: US 9,703,825 B2
(45) Date of Patent: Jul. 11, 2017

(54) MAINTENANCE OF A PRE-COMPUTED RESULT SET

(71) Applicants: Xiao Ming Zhou, Dublin, CA (US); Xun Cheng, Dublin, CA (US); Haiyan Du, Dublin, CA (US); Nitesh Maheshwari, Dublin, CA (US); Prabhas Kumar Samanta, Dublin, CA (US)

(72) Inventors: Xiao Ming Zhou, Dublin, CA (US); Xun Cheng, Dublin, CA (US); Haiyan Du, Dublin, CA (US); Nitesh Maheshwari, Dublin, CA (US); Prabhas Kumar Samanta, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 211 days.

(21) Appl. No.: 14/056,541

(22) Filed: Oct. 17, 2013

(65) Prior Publication Data

US 2015/0112922 A1   Apr. 23, 2015

(51) Int. Cl.
*G06F 17/30* (2006.01)

(52) U.S. Cl.
CPC ............... *G06F 17/30383* (2013.01)

(58) Field of Classification Search
CPC ......... G06F 17/30725; G06F 17/30876; G06F 17/30339; G06F 17/30628; G06F 17/30949; G06F 17/30289; G06F 17/30383
USPC ........................................................ 707/103
See application file for complete search history.

(56) References Cited

U.S. PATENT DOCUMENTS

| | | |
|---|---|---|
| 5,822,749 A | 10/1998 | Agarwal |
| 6,581,205 B1 | 6/2003 | Cochrane et al. |
| 6,983,291 B1 | 1/2006 | Cochrane et al. |
| 7,167,878 B2 | 1/2007 | Chan et al. |
| 7,606,827 B2 | 10/2009 | Nica |
| 7,917,502 B2 | 3/2011 | Cheng et al. |
| 8,065,269 B2 | 11/2011 | Nica et al. |
| 8,126,870 B2 | 2/2012 | Chowdhuri et al. |
| 8,306,959 B2 | 11/2012 | Nica et al. |
| 2001/0047279 A1* | 11/2001 | Gargone ............... G06Q 10/067 705/342 |
| 2002/0111922 A1* | 8/2002 | Young .................... G06Q 10/10 705/80 |
| 2003/0187858 A1 | 10/2003 | Kirk et al. |
| 2004/0153480 A1* | 8/2004 | Conrad ............ G06F 17/30575 |
| 2006/0047696 A1 | 3/2006 | Larson et al. |
| 2007/0214104 A1* | 9/2007 | Miao ................. G06F 17/30463 |

(Continued)

FOREIGN PATENT DOCUMENTS

EP        1081611 A2     3/2001

*Primary Examiner* — Hosain Alam
*Assistant Examiner* — Saba Ahmed
(74) *Attorney, Agent, or Firm* — Mintz Levin Cohn Ferris Glovsky and Popeo, P.C.

(57) ABSTRACT

A method, a system and a computer program product for maintaining a pre-computed result set are disclosed. A server coupled to a data source determines whether an object stored in the data source received an update. The server identifies at least one identifier associated with a pre-computed result set based on that determination. The pre-computed result set is computed based on the object. The server computes an updated pre-computed result set using the identifier by applying the received update to the pre-computed result set.

18 Claims, 7 Drawing Sheets

(56) References Cited

U.S. PATENT DOCUMENTS

| | | |
|---|---|---|
| 2008/0033914 A1 | 2/2008 | Cherniack et al. |
| 2009/0193006 A1* | 7/2009 | Herrnstadt ........ G06F 17/30315 |
| 2011/0138157 A1* | 6/2011 | Ni ....................... G06F 17/5072 |
| | | 712/225 |
| 2011/0252020 A1 | 10/2011 | Lim et al. |
| 2011/0255682 A1* | 10/2011 | Flockhart ............... G06Q 10/06 |
| | | 379/265.03 |
| 2011/0289322 A1* | 11/2011 | Rasti ................... H04L 63/0421 |
| | | 713/182 |
| 2012/0124040 A1 | 5/2012 | Mungikar |
| 2012/0290618 A1 | 11/2012 | Barsness et al. |
| 2013/0223276 A1* | 8/2013 | Padgett ................... H04L 45/02 |
| | | 370/254 |

\* cited by examiner

MAINTENANCE OF A PRE-COMPUTED RESULT SET

This disclosure relates generally to data processing and, in particular, to maintaining a pre-computed result set.

BACKGROUND

In today's world, business process applications form a major part of business operations. These applications can be programs that an end-user runs to accomplish certain tasks. The applications also work in conjunction with one or more back-end systems, which can store the data (for example, business objects and other business data) and logic for manipulating the data (for example transactions or other business logic). In order to accomplish various tasks, the applications can access various data, which can be stored in tables having a plurality of columns, where the tables are stored in various databases.

Access to data can be accomplished through issuance of searches and/or queries. Queries can be issued by user(s) and/or business process application(s) and can be designed to retrieve data that may be requested for various reasons, such as, analysis, operations, etc. Queries can be written using a variety of computing languages and/or environments. One example of such a computing language is a Structured Query Language ("SQL"). SQL includes a data definition language and a data manipulation language. SQL can further include data insert, query, update and delete, schema creation and modification, and data access control features.

SQL queries implement a declarative SELECT statement, which retrieves data from one or more stored tables, or expressions. SQL queries allow the user to describe the desired data, in response to which, a database management system ("DBMS") performs planning, optimizing, and performing the physical operations necessary to produce a resulting dataset.

In response to some queries, a previously generated or pre-computed dataset can be provided. Such pre-computed dataset can be referred to as a pre-computed result set ("PRS") or a materialized view. A PRS is a view for which the result is computed, stored, and available for future use. A server can be configured to use pre-computed result sets and, as a result, can pre-compute queries and use the pre-computed result during subsequent iterations. PRS allows performing of many of the same operations that are performed on tables on pre-computed result sets, including creating indexes and running update statistics.

However, business process applications generate vast amounts of data during operation, thereby adding, deleting, and/or updating data that may be stored and available for queries. As such, pre-computed result sets that have not been updated with the most recent data generated by such business process applications might not provide accurate responses to queries, may hamper operation of the business process applications, and may potentially increase operational costs. Thus, to provide the most up-to-date data in response to queries, the pre-computed result sets should be maintained and updated.

SUMMARY

In some implementations, the current subject matter relates to a computer implemented method for maintaining a pre-computed result set. The method can include determining, using a server coupled to a data source, whether an object stored in the data source received an update, identifying, using the server, based on the determining, at least one identifier associated with a pre-computed result set, the pre-computed result set being computed based on the object, and computing, using the server, an updated pre-computed result set using the identifier by applying the received update to the pre-computed result set. The determining, the identifying, and the computing can be performed by at least one processor of at least one computing system.

In some implementations, the current subject matter can include one or more of the following optional features. The method can also include updating, after receiving the update to a base table, the object by merging it with at least one difference between the object and the received update.

In some implementations, the updated pre-computed result set can be merged with at least one difference between the object and the received update associated with the base table.

In some implementations, the object can be a table containing a plurality of rows, wherein the identifier is associated with at least one row in the table.

In some implementations, the received update can include at least one of the following: a data insert operation, a data deletion operation, and a data update operation.

In some implementations, the pre-computed result set can be computed based on a plurality of objects stored in at least one data source.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
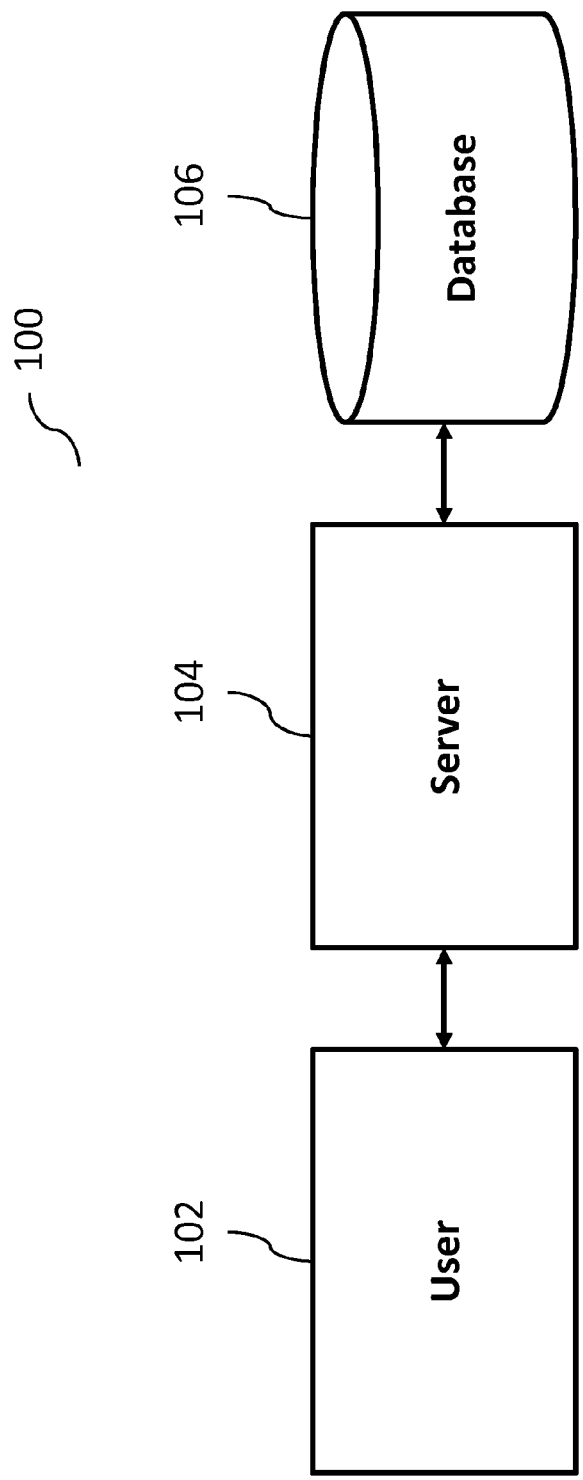
FIG. 1 illustrates an exemplary system maintaining and/or updating a pre-computed result set, according to some implementations of the current subject matter.

FIG. 1 illustrates an exemplary system 100 maintaining and/or updating a pre-computed result set, according to some implementations of the current subject matter. The system 100 can include a user 102, a server 104, and a data source 106.

The server 104 can be a query server that the user 102 can send a query or a request to obtain specific data. The server 104 can process the received query (e.g., a structured query language ("SQL") query) and determine which data sources (e.g., data source 106) need to be accessed for the purposes of generating a response to the client's query.

The data source 106 can include any query-responsive data sources, e.g., an SQL relational database management system. In some implementations, the data source can include a relational database, a multi-dimensional database, an eXtendable Markup Language ("XML") document, or any other data storage system storing structured and/or unstructured data. The data stored in the data source 106 can be distributed among several relational databases, warehouses, multi-dimensional databases, and/or any other data sources, and/or any combinations thereof.

The data source 106 can include one or more On-Line Analytical Processing ("OLAP") databases, spreadsheets, text documents, presentations, etc. The data source 106 can also be implemented in a Random Access Memory ("RAM"), one or more fixed disks (e.g., persistent memory for storing their respective portions of the full database), an "in-memory" database (where RAM can be used for cache memory and for storing its entire respective portion of the full database). Further, the data contained in the data source can include tabular data, row-based data stored in row format, column-based data stored in columnar format, and object-based data. The data source can support multi-tenancy by providing multiple logical database systems which are programmatically isolated from one another. The data contained in the data source can be indexed and/or selectively replicated in an index to allow fast searching and retrieval.

In some implementations, the data source 106 (and/or a separate database) can store information about structure, relationships and meaning of the data contained in the data source 106. The metadata can provide definitions for a schema of database tables stored in the data source 106, which can specify names of the database tables, columns of the databases tables, data types associated with columns, and any other information.

The user 102 can be any user, a computing device executing a software application, a software application, and/or any other entity. The user can issue a query to the server 104 via appropriate user interfaces. The system 100 can process the query, which can contain various query language statements (e.g., SQL's SELECT statements, WHERE clauses, etc.) and can generate data that is responsive to the query. In responding to the query, the system 100 can also implement pre-computed result sets that can be stored in one or more data sources 106. Pre-computed result sets can be viewed as snapshot tables that can capture and keep query results (e.g., results of SQL's SELECT statements) in a persistent storage format in the data source 106. Such storage format is also referred to as a materialized view.

Figure 2:
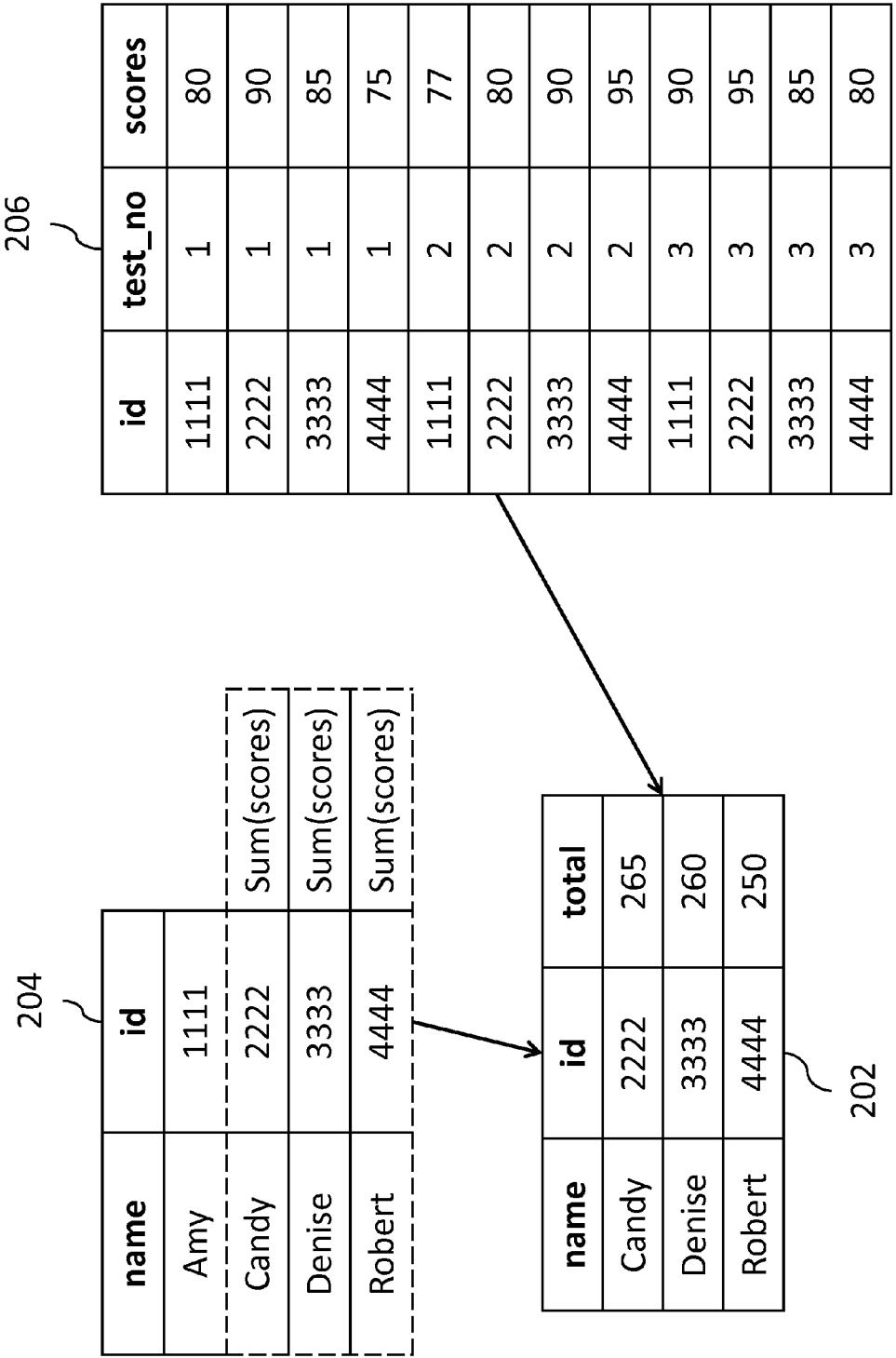
FIG. 2 illustrates an exemplary pre-computed result set, according to some implementations of the current subject matter.

FIG. 2 illustrates an exemplary pre-computed result set 202, according to some implementations of the current subject matter. The pre-computed result set 202 can be generated or derived from tables 204 (containing information about students ("s")) and 206 (containing information about test results ("r")), as shown in FIG. 2, using the following SQL expression:

SELECT s.name, s.id, sum(r.scores) total
    FROM students s, results r
        WHERE s.id = r.id and s.id > 1111
        GROUP BY s.name, s.id The exemplary pre-computed result set 202 can include information about students having certain identification information ("id") that is above a certain value (e.g., "1111") and a corresponding total score on all tests taken by those students. This information can be derived from a student table 204 and a test result table 206, which can be referred to as base tables. The student table 204 can include entries containing names of students ("Amy", "Candy", "Denise", "Robert") and their corresponding ids ("1111", "2222", "3333", "4444", respectively). Additionally, in accordance with the above query, the student table 204 can also be used with results table 206 to compute a sum of test scores ("sum(scores)") for each particular student in the student table 204 as designated by the query (i.e., the sum of test score is computed only for those students whose ids exceed "1111" value). The base table 206 can include information about student identifiers, test identifiers (corresponding to specific tests taken by each student), and scores values (which can correspond to test scores obtained by each student having a particular id on a specific test (as designated by "1", "2", "3", and "4")). The pre-computed result set table 202 can be a view generated by the above query, whose result set is stored in the database as a special table. The stored pre-computed result set can allow queries to be quickly answered without performing re-computation of the any of the above values or any other operations (e.g., aggregation, etc.).

When a query is issued, the current subject matter system 100 can rewrite the query, such as by using a conventional query optimization component, so that the resulting data or a part of the resulting data can be obtained from the pre-computed result set 202. In some implementations, the current subject matter system 100 can also ensure that the pre-computed result set 202 is maintained in an up-to-date condition, which might be necessary in view of, for example, information being updated in the base tables 204 and/or 206. The updating of the pre-computed result set can be done at any time (e.g., automatically, manually, periodically, upon storage of new data into base tables, etc.) so that when the pre-computed result set is accessed by the query, the most up-to-date information is returned to the user.

In some implementations, the system 100 can perform update of the pre-computed result set using a total re-computation approach and/or an incremental maintenance approach. The total re-computation approach can involve re-computation of the pre-computed result set from scratch every time there is an update to any of the base tables. The incremental maintenance approach can apply delta changes to the existing pre-computed result set that can be derived from the changes to any of the base tables. In some implementations, the incremental maintenance of the pre-computed result set can be performed using the following algorithm.

Figure 3:
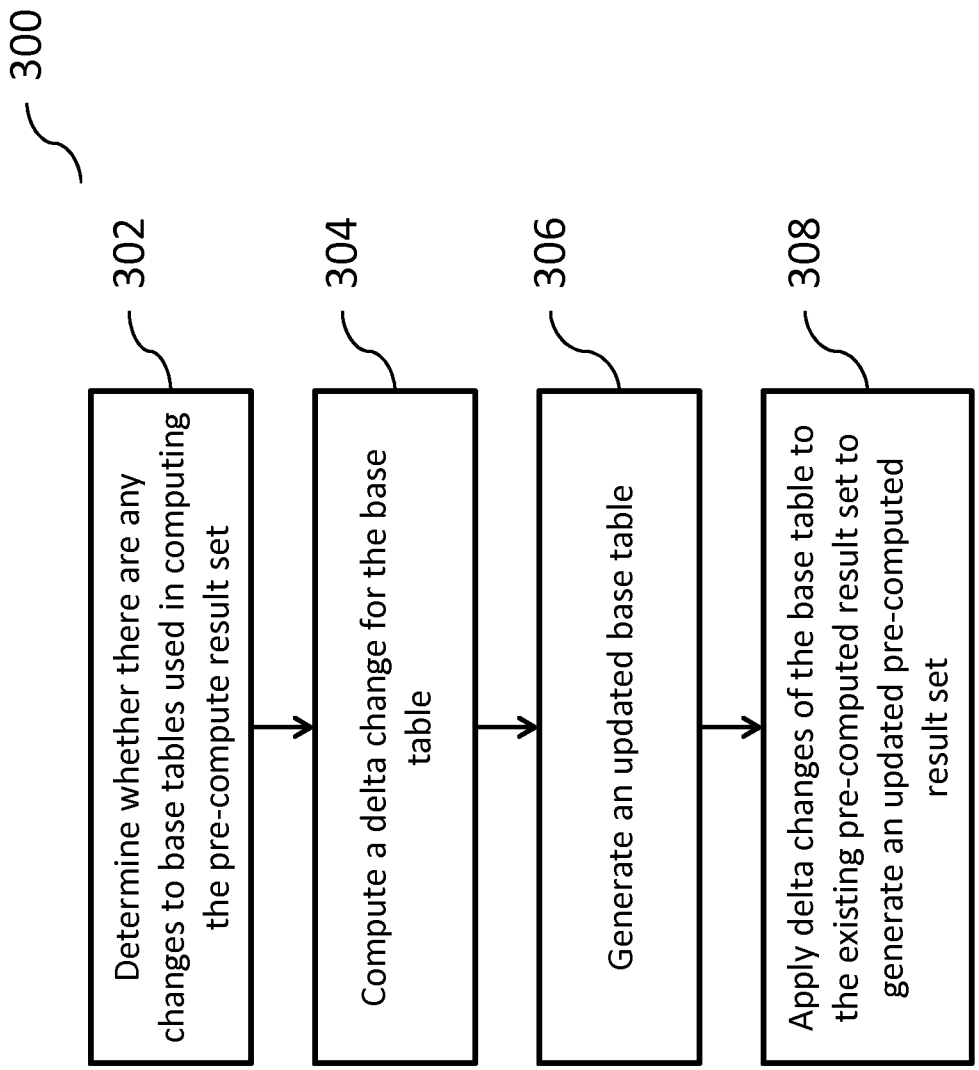
FIG. 3 illustrates an exemplary process for updating a pre-computed result set, according to some implementations of the current subject matter.

FIG. 3 illustrates an exemplary process 300 for updating a pre-computed result set, according to some implementations of the current subject matter. At 302, a determination can be made whether there are any changes to at least one base table that is used in computing the pre-compute result set. This can be one or both of the tables 204 and 206 shown in FIG. 2. If there are any changes, a delta change can be computed for each base table 204, 206, at 304. At 306, updated base tables can be determined by applying the calculated delta changes of each base table to the original base tables. At 308, the delta changes of the underlying base tables are applied to the existing pre-computed result set to generate an updated pre-computed result set. The computations of the method 300 can also be performed using the following expressions.

Assuming that the pre-computed result set is an algebraic expression performed on a set of two base tables on which the pre-computed result set is defined, the pre-computed result set can be defined as follows:

$$PRS = A \bowtie B \quad (1)$$

where PRS is a pre-computed result set; A and B are base tables; and $\bowtie$ is a natural join operation performed on these tables. It should be noted that any number of base tables can be used.

The changes to the pre-computed result set can be expressed as follows:

$$\delta(PRS) = \{\delta A \bowtie B\} \cup \{A \bowtie \delta B\} \cup \{\delta A \bowtie \delta B\} \quad (2)$$

where $\delta A$ and $\delta B$ refer to delta changes to the base tables A and B. Thus, when the delta changes are applied to the base tables, the updated table can become: $A^v = (A \cup \delta A)$ (for table A; similar expression applies to table B).

Thus, a delta change to a pre-computed result set that uses data from a plurality of base tables that have delta changes applied to them can be computed using the following expression:

$$\delta PRS = \cup_{i=1}^{n} \delta PRS_i \quad (3)$$

where $\delta PRS_i$ can be computed using the following $$\delta PRS_i = \{R_1^v \bowtie R_2^v \ldots \bowtie R_{i-1}^v \bowtie \delta R_i \bowtie R_{i+1} \ldots R_n\} \quad (4)$$

Hence, the updated pre-computed set can then be computed as follows:

$$PRS^v = PRS \cup \delta PRS \quad (5)$$

In some implementations, the R and $\delta R$ values in the above equation (4) can be computed before in order to compute $\delta PRS_i$. The current subject matter system, using the incremental update policy, can update the pre-computed result set in the same transaction that involves updates to the underlying base tables. The delta changes can also be captured in a special light weight table that contains information about inserted and/or deleted rows and can be stored in a designated cache.

Figure 4:
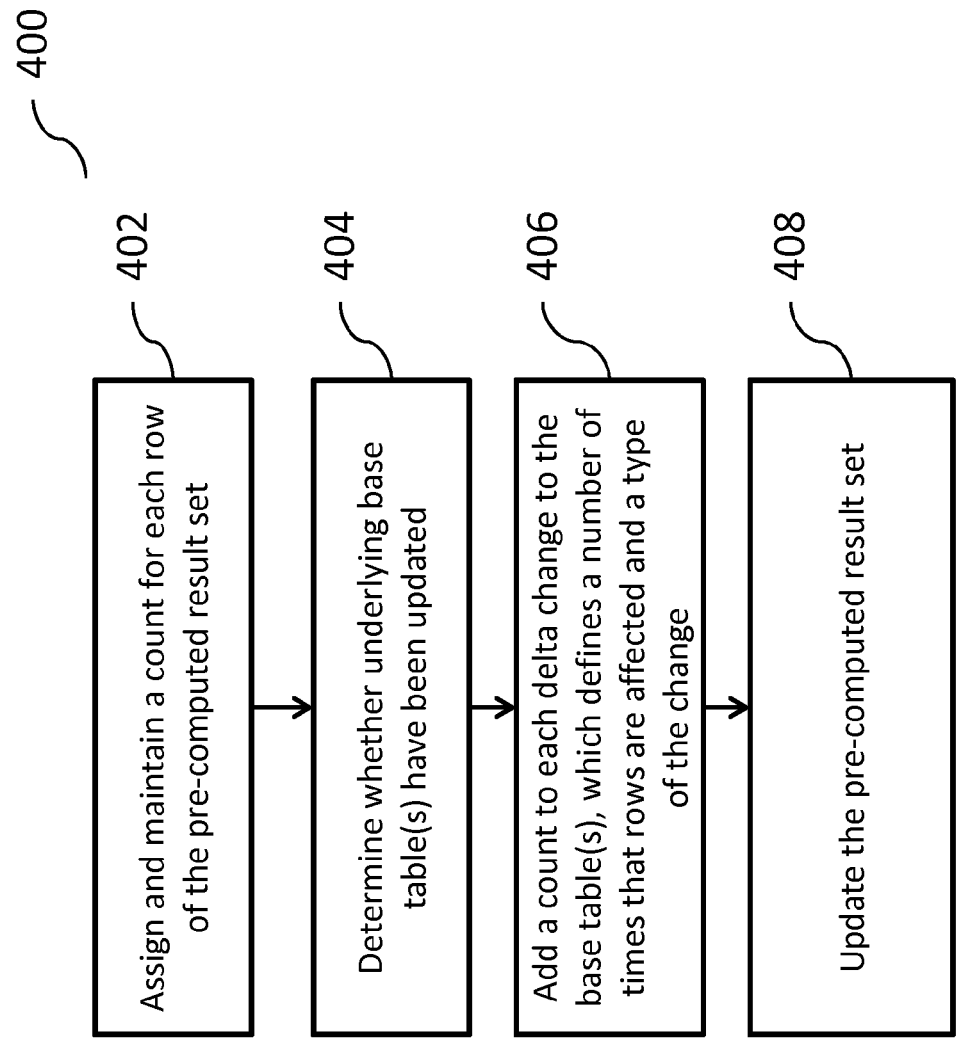
FIG. 4 illustrates an exemplary counting algorithm, according to some implementations of the current subject matter.

In some implementations, the current subject matter system can also implement a counting algorithm to update the pre-computed result set. FIG. 4 illustrates an exemplary counting algorithm 400, according to some implementations of the current subject matter. In some implementations, the current subject matter system can assign and maintain a count for each row of the pre-computed result set, at 402. The count can describe a number of unique derivations for that row from the underlying base tables. Upon determination (at 404) that one or more of the underlying base tables have been updated, the delta changes to the base tables can be supplied with counts defining a number of times that rows are affected by changes as well as a type of the operation (e.g., insert, delete, etc.), at 406. If a new row is inserted into the base table, the count of the equivalent entry can have a count of '+1', while a delete can have a count of '−1'. An update can be modeled as a delete followed by an insert. Depending on the modification type (insert/delete/update) equivalent operations can be done to update the pre-computed result set, at 408.

In some implementations, the above counting algorithm can be implemented using the following expressions. Assuming that PRS V1 is a pre-computed result set that is defined based on underlying tables A and B, i.e., $V1 = A \bowtie B$. Changes made to tables A and B can be represented as $\delta A$ and $\delta B$, respectively. An updated pre-compute result set, $V1^v$, can be expressed as follows:

$$V1^v = A^v \bowtie B^v \quad (6)$$

where $A^v = A \cup \delta A$ and $B^v = B \cup \delta B$ and $\cup$ is an additive union operation in this case.

The additive union operation of two sets of tuples S1 and S2 can be defined as follows:
(i) If a tuple t appears in only one of S1 or S2 with a non-zero count c, then the tuple t appears in S1$\cup$S2 with a count c;
(ii) If a tuple t appears in both S1 and S2 with counts of c1 and c2, where at least one the counts is positive, and c1+c2 must be non-negative, then
  a. If c1+c2>0, then tuple t appears in S1$\cup$S2 with a count c1+c2;
  b. If c1+c2=0, then tuple t does not appear in S1$\cup$S2.

Based on the above, equation (6) can be rewritten as follows:

$$V1^v = V1 \cup (\delta A \bowtie B) \cup (A^v \bowtie \delta B) \quad (7)$$

Thus, to compute $V1^v$, $\delta A \bowtie B$ and $A^v \bowtie \delta B$ can be determined, which can be followed by performing an additive union of these terms with the original pre-computed result set V1. For n-relations (n is an integer), the updated pre-computed result set can be determined using an additive union of a prior version of the pre-computed result with the n terms whose $i^{th}$ term can be determined using the following $$s_i = s_1^v \bowtie s_2^v \ldots \bowtie s_{i-1}^v \bowtie \delta s_i \bowtie s_{i+1} \ldots s_n \quad (8)$$

As can be seen from above, in the counting algorithm, after computing the delta pre-computed result set, each row in the delta pre-computed result set can be identified if it is a new row that has to be inserted in the pre-computed result or an existing row in pre-computed result which needs an update/deletion. Thus, the count value of "+1" or "−1" can indicate whether the change is an update, deletion and/or an insertion. In some implementations, the current subject matter system provides this functionality using a merge operator. Further, maintenance of pre-computed result can be performed on a per table basis. Thus, if a PRS V1 has two underlying base tables A and B then only one of them can be updated at a time.

Once an object is modified and/or updated, such as by receiving a request to insert, delete, and/or update data stored in the object (e.g., using a data manipulation language ("DML") operation), the current subject matter system can determine whether the data that has been modified and/or the object which has been modified has any pre-computed result set associated with the object. This pre-computed result set is then retrieved and updated in the manner discussed above.

Figure 5:
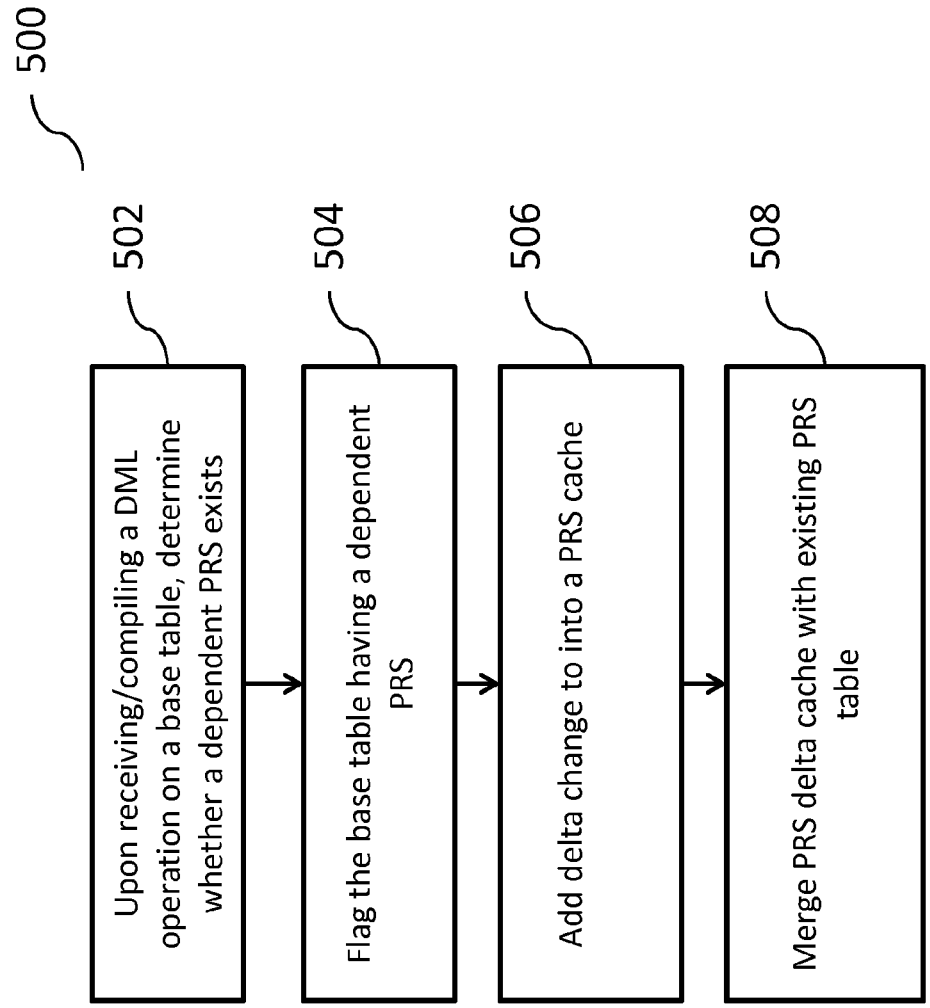
FIG. 5 illustrates an exemplary process for updating a pre-computed result set associated with an object, according to some implementations of the current subject matter.

FIG. 5 illustrates an exemplary process 500 for updating a pre-computed result set associated with an object, according to some implementations of the current subject matter. At 502, upon receiving and compiling of a DML operation (e.g., insert/delete/update data) on an object (e.g., a base table), the current subject matter system 100 can determine whether a pre-computed result set is associated with the object. If so, the object can be marked or flagged, at 504. Such flagging will indicate that upon updating the data in the object, its corresponding pre-computed result set(s) will need to be updated as well. While DML operation is being executed, the delta changes to the object (as discussed above) can be added to a cache associated with the corresponding pre-computed result set(s), at 506. In some implementations, compilation and execution of the DML operation can be performed during or as a part of a DML operation plan that may be prepared by the system 100. Subsequent to the execution of the DML operation, delta changes to the pre-computed result set as stored in the pre-computed result set cache are merged with the original pre-computed result set, at 508. This can be accomplished using an outer join condition or using a merge operator between the keys of the pre-computed result set and any delta changes to the pre-computed result set. The merging of the delta changes and the pre-computed result set can be performed during a separate pre-computed result set maintenance plan that can be also developed by the system 100.

In some implementations, the method 500 can be performed using the following exemplary merge operator general syntax code:

```
MERGE INTO <table-name>
USING <reference table-name>
ON search conditions
WHEN matching conditions
THEN modification statements
........ More when then statements
matching conditions:
[NOT] MATCHED [AND search conditions]
modification statements:
UPDATE SET <assignment clause> | DELETE | INSERT values( )
```

Thus, the above general syntax can be used for maintenance of an exemplary pre-computed result set "prs1" in the following manner:

```
MERGE INTO prs1 as r
USING delta_prs1 as t
ON r.key1 = t.key1 ....... (other key matching)
When MATCHED and r.count + t.count = 0
THEN
    DELETE (will automatically delete the current row under
    consideration in r)
WHEN MATCHED
THEN
    UPDATE set r.count = r.count + t.count and ....... (will update the
current row in r)
WHEN NOT MATCHED
THEN
    INSERT values(t.key1, ....other keys...., t.count , t.revenue) (Insert a
    new row in r)
```

In the above code, t.count can correspond to the "+1" or "−1" values depending on whether the DML operation on the base table corresponds to an insert or delete, respectively. In some implementations, a join of the table being modified with the other tables present in the pre-computed result set definition can be performed to determine whether a row in the table exists that can satisfy the join conditions, and if there are any such rows, the rows can be appropriately updated/deleted.

In some implementations, an update to base table can also trigger incremental maintenance of all the pre-computed result sets that depend on the base table and the pre-computed result sets that are maintained as part of the same transaction, which updates the base table. For maintenance of a pre-computed result set, an outer join between the key columns of the pre-computed result set and any delta changes to the table, where the pre-computed result set can be the inner child of the outer join. This is because there is a need to update/delete a tuple when there is a match. In the event there is no matching tuple in pre-computed result set, the row can be inserted. Thus, the maintenance of a pre-computed result set process can be implemented as an outer join because even if there is no match, the tuple with a NULL value can be passed onto the inner child's columns.

In some implementations, maintenance of a pre-computed result set can include a determination as to when to update (and/or refresh) the pre-computed result set and a determination as to how to update (and/or refresh) the pre-computed result set. A determination as to when to update the pre-computed result set can relate to the timing of an update to the pre-computed result set based on incoming queries. The queries can be insert, delete, update, and/or any other queries that update at least one base table that is used for computation of the pre-computed result set.

In some implementations, the determination as to how to update a pre-computed result set can be policy-based, where the policy can be developed by the user, application developer, administrator, etc. The policy can indicate how the pre-computed result should be updated in relation to the update of the base table(s) based on which it was computed. The policy can include various options for updating pre-computed result set, such as, for example, but not limited to, a total re-computation of the pre-computed result set and an incremental updating of the pre-computed result set. The former option can involve populating data to the pre-computed result set from scratch every time there is an update to one or more base table(s) based on which the pre-computed result set was defined. The latter option can include applying delta changes to an existing or computed pre-computed result set using delta updates to the base table(s) and merging them with the pre-computed result set.

The incremental approach to maintaining a pre-computed result set can also include immediate application/merger of delta updates with an existing pre-computed result set. Using the immediate application/merger of updates, if a query (such as a DML query) is used to update base table(s) based on which an existing pre-computed result set is determined, the existing pre-computed result set can be updated (if necessary) as part of the same transaction during which updates to the base table(s) are implemented.

The following examples illustrate an immediate update to the pre-computed result set approach. It should be noted that these examples are not intended to limit the scope of the subject matter discussed herein and are provided for illustrative purposes only. In these examples, it is assumed that a pre-computed result set p1 has been computed based on base tables t1 and t2 using the following definition create precomputed result set p1
as
select t1.c1, t2.a2 from t1, t2 where t1.c1=t2.a1

Further, for the purposes of this example, it can be assumed that the following data is present in table t1 at the time of creation of p1:

| c1 | c2 | c3 |
|----|----|------|
| 1  | 3  | Aagg |
| 2  | 8  | Xyz  |

In the above table t1, c1, c2, c3 refer to columns in table t1. Table t2 having columns a1, a2, a3, can have the following values at the time of creation of the pre-computed result set p1:

| a1 | a2 | a3   |
|----|----|------|
| 1  | 5  | Ghr  |
| 2  | 1  | Gser |
| 3  | 6  | agfh |

Using information contained in the base tables t1 and t2, the pre-computed result set p1 can be computed as follows:

| c1 | a2 |
|----|----|
| 1  | 5  |
| 2  | 1  |

If a new row is to be inserted in the base table t1, where the row can include values (3, 7, "fhi"), then the pre-computed result set p1 can be updated by including a new row that contains values (3, 6):

| c1 | a2 |
|----|----|
| 1  | 5  |
| 2  | 1  |
| 3  | 6  |

When a row is deleted from the base table t2, for example, row a1=2, then a row is deleted from the pre-computed result set p1:

| c1 | a2 |
|----|----|
| 1  | 5  |
| 3  | 6  |

The following example illustrates maintenance of a pre-computed result set using a group-by clause. In this example, a pre-computed result set p2 can be computed based on a base table t1, which contains:

| c1 | c2 | c3 |
|----|----|----|
| 1  | 3  | 50 |
| 1  | 5  | 40 |
| 2  | 8  | 30 |
| 3  | 5  | 60 |

The pre-computed result set p2 can be defined using the following:
    create precomputed result set p2
    as
    select c1, sum(c3) c3_sum from t1 group by c1

Thus, the pre-computed result set can contain the following information:

| c1 | c3_sum |
|----|--------|
| 1  | 90     |
| 2  | 30     |
| 3  | 60     |

Assuming a row is inserted into the base table t1 that contains values (2, 6, 20), then the pre-computed result set p2 can be updated by replacing the row (2, 30) with a row (2, 50). This is because the column c3_sum calls for a sum of the values in that column, i.e., 30 (original value)+20 (value of the inserted row in table t1) (if a group is present in the per-computed result set). Thus, after the update, the updated pre-computed result set contains the following values:

| c1 | c3_sum |
|----|--------|
| 1  | 90     |
| 2  | 50     |
| 3  | 60     |

Assuming that another row is inserted in the base table t1 containing values (5, 10, 45), a new group will have to be formed and the updated pre-computed result set p2 will contain the following information:

| c1 | c3_sum |
|----|--------|
| 1  | 90     |
| 2  | 50     |
| 3  | 60     |
| 5  | 45     |

Then, if a row (e.g., row (3, 5, 60) is deleted from the base table t1, then the group associated with the value of c1=3 is deleted from the pre-computed result set p2, thereby generating the following updated pre-computed result set p2:

| c1 | c3_sum |
|----|--------|
| 1  | 90     |
| 2  | 50     |
| 5  | 45     |

In some implementations, the current subject matter system can include an a pre-compute result set maintenance function that can be used to perform immediate maintenance of all pre-computed result set(s) that can be dependent on a base table being modified. Using this function, the current subject matter system can read a pre-computed result set definition tree of all pre-computed result set(s) that are dependent on the base table being modified. Each definition tree can be modified such that it can be used to perform immediate maintenance. The changes to the base table can be captured in memory, which can be populated using DML operations performed on the base table. Based on the changes to the base table, delta changes to the pre-computed result set can be determined. The delta changes to pre-computed result set can be computed by using the base table changes captured in memory and marking entries associated with the base tables in the pre-computed result set definition tree as INSERTED/DELETED. Once the delta changes to the pre-computed result set are determined, an outer join (merge) between the delta changes to the pre-computed result set and the pre-computed result set can be performed. As part of the outer join, an insert and/or an update operation on row(s) in the pre-computed result set can be performed. This can depend on a result of the outer join condition. To perform the join, the join can be modeled as an UPDATE operation. Thus, further modifications of the pre-computed result set definition tree can be performed by changing a query type to UPDATE, introducing required table entries of the pre-computed result set, and introducing an outer join between key columns in pre-computed result set with delta changes to the pre-computed result set such that the pre-computed result set is the inner child of the outer join. In some implementations, modifications to the pre-computed result set definition tree, where the definition tree is changed to correspond to an updated/modified definition tree of the pre-computed result set can be performed using a tree-updating function, which can be called by the pre-compute result set maintenance function. Once the modifications are completed, a sequencer operation can be called on the updated/modified definition tree to execute pre-computed result set maintenance function.

Figure 6:
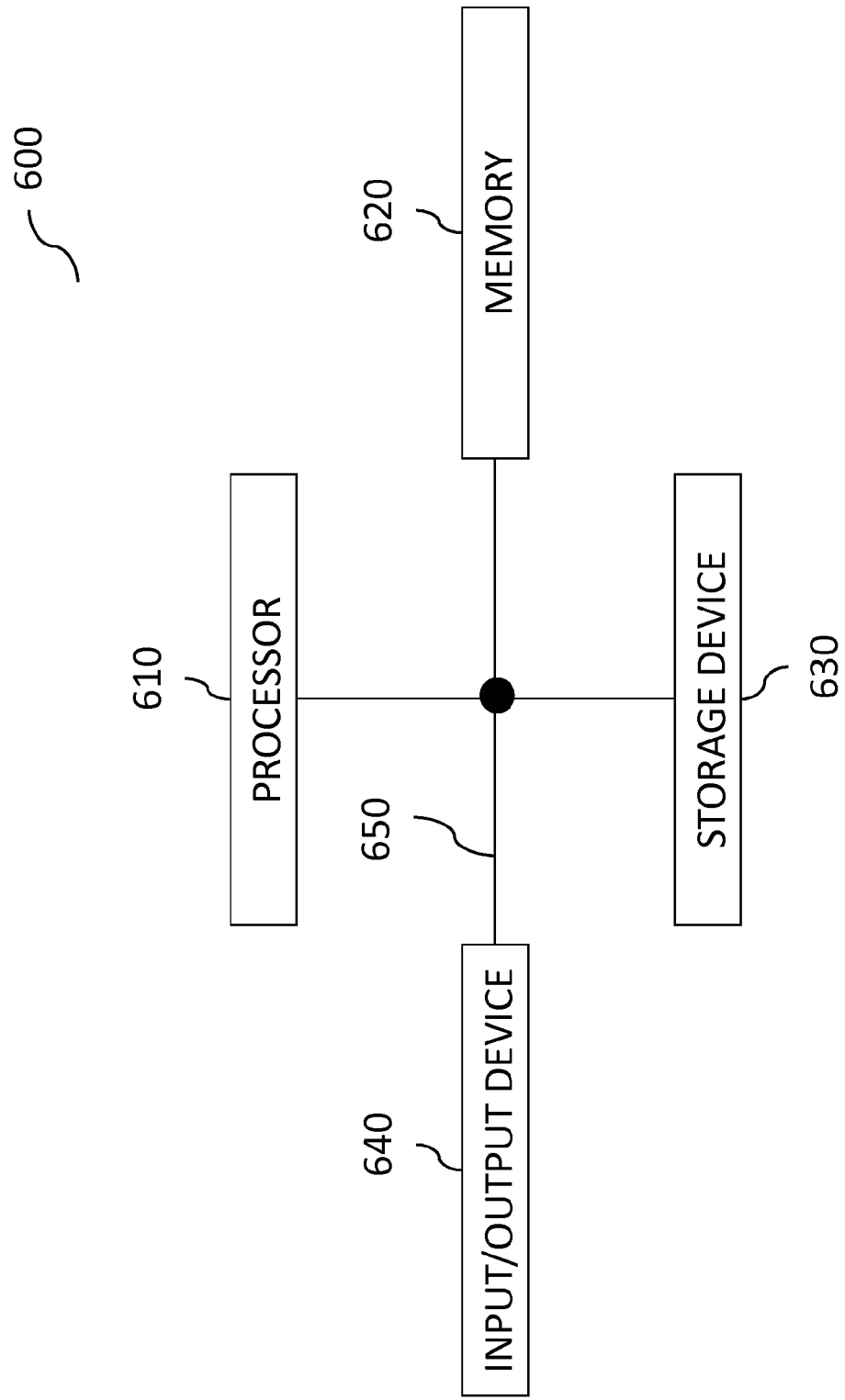
FIG. 6 illustrates an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
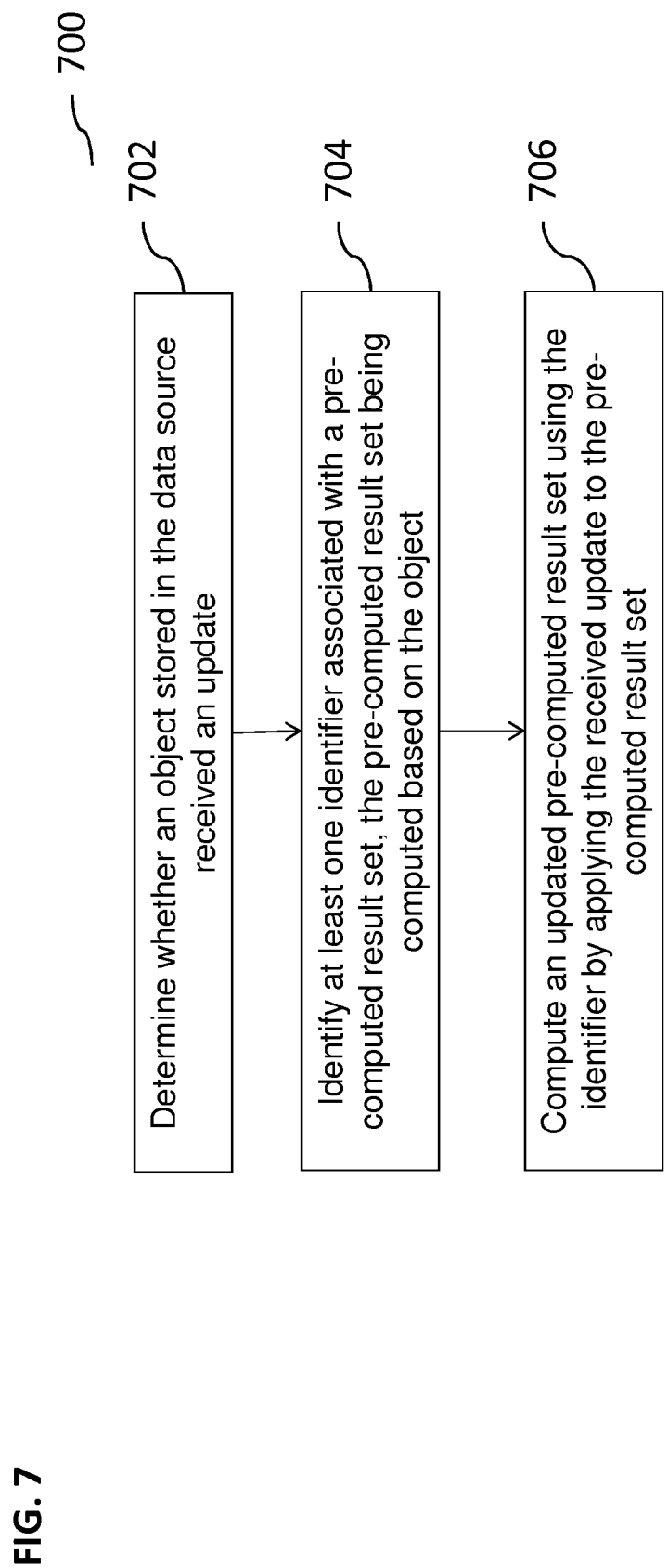
FIG. 7 illustrates an exemplary method, according to some implementations of the current subject matter.

FIG. 7 illustrates an exemplary method 700 for maintaining a pre-computed result set, according to some implementations of the current subject matter. At 702, a server (such as the server 104) coupled to a data source (such as the data source 106) can determine whether an object stored in the data source received an update. The object can be a base table that contains various data. The update can include a data insert, a deletion of data, and/or any other update to the data stored in the table. The server can identify at least one identifier associated with a pre-computed result set that is computed based on the object, at 704. Using the identifier, the received update to the object, can be applied to the pre-compute result set. At 706, the server can compute an updated pre-computed result set using the identifier by applying the received update to the pre-computed result set.

In some implementations, the current subject matter can include one or more of the following optional features. The method can further include updating, after receiving the update to a base table, the object by merging it with at least one difference between the object and the received update. The updated pre-computed result set is merged with at least one difference between the object and the received update associated with the base table. The object can be a table containing a plurality of rows and the identifier can be associated with at least one row in the table. The received update can include at least one of the following: a data insert operation, a data deletion operation or a data update operation. The pre-computed result set can be computed based on a plurality of objects stored in at least one data source.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method comprising:
   determining, using a server coupled to a data source, whether an object stored in the data source received an update;
   identifying, using the server, based on the determining, at least one identifier associated with a pre-computed result set, the pre-computed result set being computed based on the object; and
   computing, using the server, an updated pre-computed result set using the identifier by applying the received update to the pre-computed result set, the updated pre-computed result set being computed based on at least one delta change to at least one row in a base table, wherein the at least one row is associated with a count being indicative of a number of times the at least one row has received an update and a type of operation associated with the update and describing at least one derivation for the at least one row based on the base table, the computing triggers a computation of an update of at least another pre-computed result set, the at least another pre-computed result set being dependent on the base table in accordance with a pre-computed result set definition tree, wherein the pre-computed result set definition tree is modified for computing the update of the at least another pre-computed result set in accordance with the update of the at least another pre-computed result set;
   wherein the at least one of the determining, the identifying, and the computing is performed by at least one processor of at least one computing system.

2. The method according to claim 1, further comprising updating, after receiving the update to a base table, the object by merging it with at least one difference between the object and the received update.

3. The method according to claim 1, wherein the updated pre-computed result set is merged with at least one difference between the object and the received update associated with the base table.

4. The method according to claim 1, wherein the object is a table containing a plurality of rows, wherein the identifier is associated with at least one row in the table.

5. The method according to claim 1, wherein the received update includes at least one of the following: a data insert operation, a data deletion operation, and a data update operation.

6. The method according to claim 1, wherein the pre-computed result set is computed based on a plurality of objects stored in at least one data source.

7. A computer program product comprising a non-transitory machine-readable medium storing instructions that, when executed by at least one programmable processor, cause the at least one programmable processor to perform operations comprising:
determining, using a server coupled to a data source, whether an object stored in the data source received an update;
identifying, using the server, based on the determining, at least one identifier associated with a pre-computed result set, the pre-computed result set being computed based on the object; and
computing, using the server, an updated pre-computed result set using the identifier by applying the received update to the pre-computed result set, the updated pre-computed result set being computed based on at least one delta change to at least one row in a base table, wherein the at least one row is associated with a count being indicative of a number of times the at least one row has received an update and a type of operation associated with the update and describing at least one derivation for the at least one row based on the base table, the computing triggers a computation of an update of at least another pre-computed result set, the at least another pre-computed result set being dependent on the base table in accordance with a pre-computed result set definition tree, wherein the pre-computed result set definition tree is modified for computing the update of the at least another pre-computed result set in accordance with the update of the at least another pre-computed result set.

8. The computer program product according to claim 7, wherein the operations further comprise
updating, after receiving the update to a base table, the object by merging it with at least one difference between the object and the received update.

9. The computer program product according to claim 7, wherein the updated pre-computed result set is merged with at least one difference between the object and the received update associated with the base table.

10. The computer program product according to claim 7, wherein the object is a table containing a plurality of rows, wherein the identifier is associated with at least one row in the table.

11. The computer program product according to claim 7, wherein the received update includes at least one of the following: a data insert operation, a data deletion operation, and a data update operation.

12. The computer program product according to claim 7, wherein the pre-computed result set is computed based on a plurality of objects stored in at least one data source.

13. A system comprising:
at least one programmable processor; and
a machine-readable medium storing instructions that, when executed by the at least one programmable processor, cause the at least one programmable processor to perform operations comprising:
determining, using a server coupled to a data source, whether an object stored in the data source received an update;
identifying, using the server, based on the determining, at least one identifier associated with a pre-computed result set, the pre-computed result set being computed based on the object; and
computing, using the server, an updated pre-computed result set using the identifier by applying the received update to the pre-computed result set, the updated pre-computed result set being computed based on at least one delta change to at least one row in a base table, wherein the at least one row is associated with a count being indicative of a number of times the at least one row has received an update and a type of operation associated with the update and describing at least one derivation for the at least one row based on the base table, the computing triggers a computation of an update of at least another pre-computed result set, the at least another pre-computed result set being dependent on the base table in accordance with a pre-computed result set definition tree, wherein the pre-computed result set definition tree is modified for computing the update of the at least another pre-computed result set in accordance with the update of the at least another pre-computed result set.

14. The system according to claim 13, wherein the operations further comprise
updating, after receiving the update to a base table, the object by merging it with at least one difference between the object and the received update.

15. The system according to claim 13, wherein the updated pre-computed result set is merged with at least one difference between the object and the received update associated with the base table.

16. The system according to claim 13, wherein the object is a table containing a plurality of rows, wherein the identifier is associated with at least one row in the table.

17. The system according to claim 13, wherein the received update includes at least one of the following: a data insert operation, a data deletion operation, and a data update operation.

18. The system according to claim 13, wherein the pre-computed result set is computed based on a plurality of objects stored in at least one data source.

* * * * *